(Model.)

H. C. MINER.
STANCHION.

No. 417,265.  Patented Dec. 17, 1889.

Witnesses:
F. W. Ballou
L. L. Crosby

Inventor:
Henry C. Miner
By G. W. Frost Atty.

(Model.)

H. C. MINER.
STANCHION.

No. 417,265. Patented Dec. 17, 1889.

Witnesses:
F. W. Ballard
C. L. Crosby

Inventor:
Henry C. Miner
By G. W. Ford Atty.

UNITED STATES PATENT OFFICE.

HENRY C. MINER, OF STAFFORD, NEW YORK.

STANCHION.

SPECIFICATION forming part of Letters Patent No. 417,265, dated December 17, 1889.

Application filed July 22, 1889. Serial No. 318,322. (Model.)

*To all whom it may concern:*

Be it known that I, HENRY C. MINER, a citizen of the United States, residing at Stafford, in the county of Genesee and State of New York, have invented a new and useful Improvement in Stanchions, of which the following is a specification.

My invention relates to improvements in cattle-stanchions in which the head of the animal is thrust through between upright bars, one of which is made to swing from a pivotal point formed in its lower end, so as to enlarge the space between the bars to allow the head to be readily inserted, after which the operator causes the bar to be swung back into the upright position, whereby the animal is secured.

The objects of my improvements are to afford facilities for quickly securing the animal in a safe position, yet allow of a freedom of movement while thus secured, by providing a single pivoted stanchion-frame for each creature; also to arrange for the automatic return of the stanchion-frame to its normal position after the discharge of the animal; also to lock the stanchion-frame, when in a state of rest ready for future use, by means of levers and springs that are brought into action by the movement of the swinging bar, and by the arrangement of the operating parts rendering the stanchion nearly automatic in its actuation. I attain these objects by the mechanism illustrated in the accompanying drawings, in which—

Figure 1:
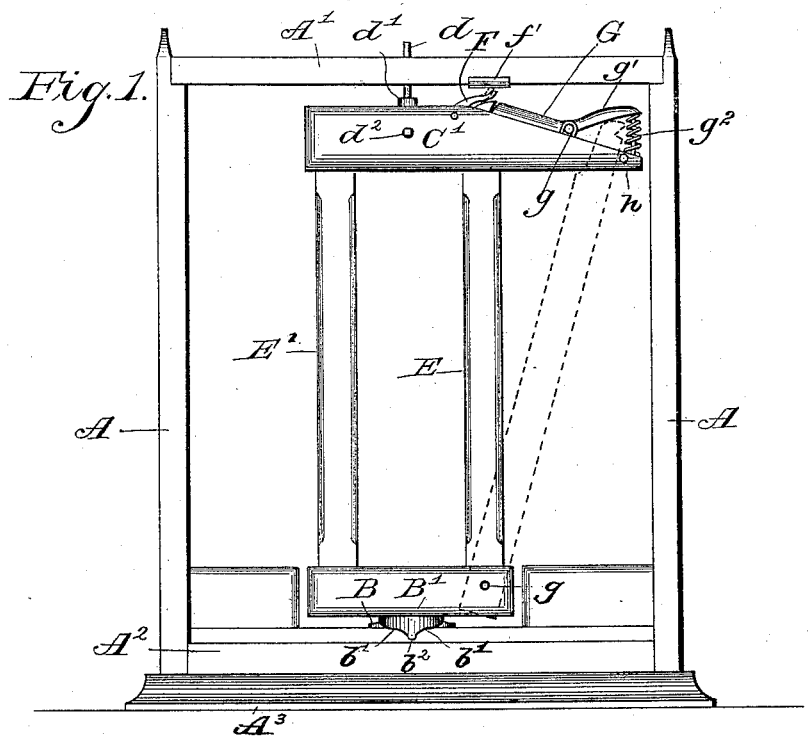
Figure 2:
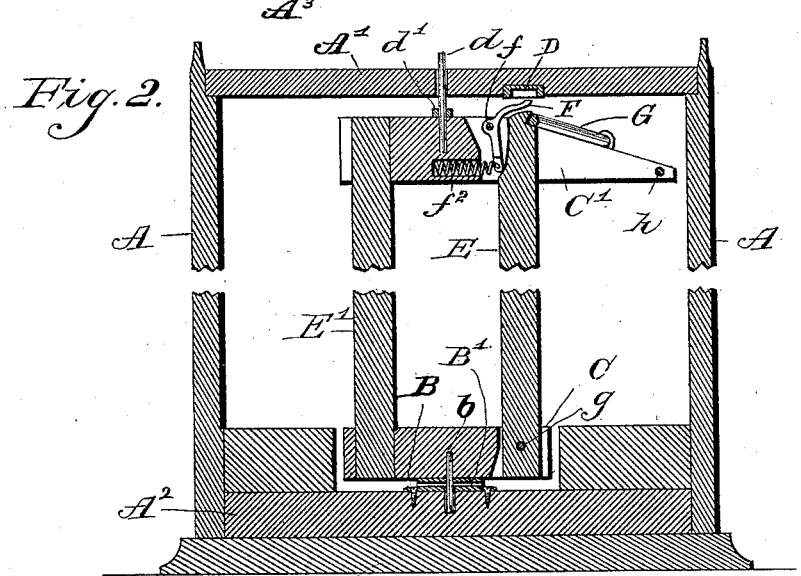
Figure 3:
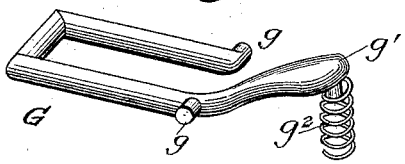
Figure 4:
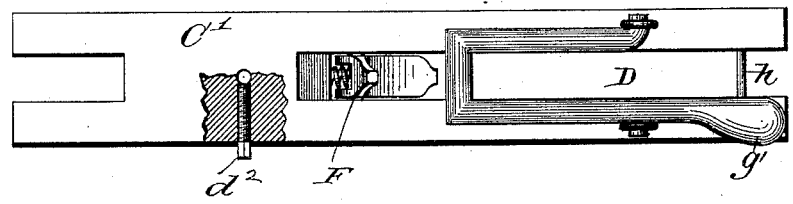
Figure 5:
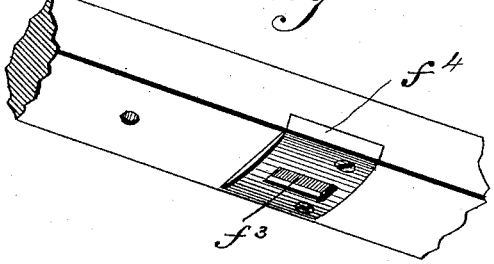
Figure 6:
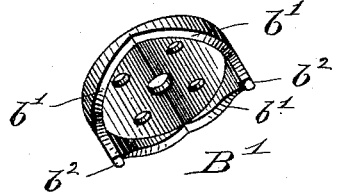

Figure 1 is a side view of the stanchion attached to its securing-frame, the relative movements of which are shown in dotted lines. Fig. 2 is a sectional view taken laterally through the heads of the stanchion-frame, the vertical bars being broken away at their centers to shorten the view. Fig. 3 is a detail view of the latch and the attached spring by which the stanchion is locked in its open position ready for the insertion of the head of the animal between the securing-bars. Fig. 4 is a top view of the upper stanchion crosshead, showing the slotted end for the movement of the swinging bar. Fig. 5 is a detached face view of the locking-plate that coacts with the spring-latch shown in Fig. 3; and Fig. 6 is a perspective view of the circular flanged plate detached from its place upon the lower stanchion cross-beam.

Similar letters refer to similar parts throughout the several views.

The upright posts A may be tied together at their top ends by cross-beam A', while the lower ends are connected by the bevel-edged beam $A^2$, which beam may rest upon the floor of the stable, a section of which is herein shown and designated $A^3$.

Upon the upper beveled face of the lower beam $A^2$ is secured a plate B, and turning therein is the lower stanchion pivot-pin $b$, the said pin being secured to the circular flanged plate B'; or the same may pass through the plate and remain fixedly secured to the cross-head, forming the lower end of the stanchion-frame, (designated C.) The pin, however, should depend far enough below the stanchion-frame to at all times secure its hold with the plate B, through which it loosely passes, but in such manner that the lower end of the stanchion-frame is held in place and lateral displacement prevented.

The plate B is provided with ribs or flanges $b'$, peripherally located upon the face of the plate and depending therefrom upon an incline from a point in line through the axial center, thereby forming two doubly-inclined sections, the apex of each incline terminating at the studs $b^2$, one being directly opposite the other. These studs act as stops for preventing the entire revolution of the stanchion frame, being placed upon the apex of the double incline one-fourth of the circumference of the plate, so as to divide the rib into four sections, and forming four uniform inclined surfaces, for a purpose presently explained.

C' is the upper cross-head of the stanchion-frame, having the slot D in the inclined extension, within which slot the upper end of the swinging stanchion-bar E plays, and by which slot the bar is kept from lateral displacement.

E' is the fixed stanchion-bar, connecting the heads C C'.

$d$ is the pivot-pin for pivotally securing the upper end of the stanchion-frame to the cross-beam A'.

$d'$ is a washer upon pin $d$ for limiting the upward movement of the stanchion-frame when turning.

$d^2$ is a set-screw screw-threaded into the side of cross-head C' at a point laterally in line with the part of the pin that extends within the cross-head, the inner end of which set-screw impinges against the side of pin $d$, so as to secure the same to the head. This set-screw is used in place of having the pin rigidly attached to the head in order that the stanchion-frame may be placed in position within the stanchion-supporting frame, or removed therefrom by merely loosening the set-screw and raising the pivot-pin, which reaches through the upper beam.

F is a locking-latch placed in the slot D at the inner end of the same, and by its ears $f$ and pin $f'$ is held in such position that by means of the spiral spring $f^2$, secured to the lower end of the latch, will by compression cause the upper end of the latch to engage with the mortise $f^3$ in the beveled locking-plate $f^4$, secured upon the under side of cross-beam A'.

G is the stanchion locking-bail, hinged to the inclined slotted portion of the head C' at $g$ and provided with the hand-piece $g'$, at the free end of which is secured the spiral spring $g^2$, by which the bail end is brought down upon the top of the cross-head and made to impinge against the upper end of the swinging stanchion and within the notch therein when the said stanchion is in a closed position.

$h$ is a pin which passes through the slotted end of cross-head C' for limiting the throw of the swinging stanchion in this direction.

The operation is as follows: When the animal is to be secured by the stanchion, the swinging bar is thrown back, which, by means of the inclined plate and beveled beam beneath the stanchion-frame, will cause the frame by gravity alone to swing into true position for receiving the head of the animal upon the throwing back of the bar, which bar (when released by the lifting of the bail) will be made to swing outward by the recoil of the spring attached to the lower end of the pivoted latch, (against which the inner edge of the swinging stanchion impinges when closed,) the recoil throwing out the lower end of the latch, causing the upper end (from its central pivot) to rise, so as to enter within the mortise in the plate $f^4$, thereby locking the stanchion-frame in the open position. After the animal's head has been thrust through between the stanchion-bars the swinging bar is brought into the upright position, the beveled end of which strikes against the inner side of the cross-bar of the bail, causing the bail to rise, and after passing the cross-bar the bail will again come down upon the opposite side of the stanchion-bar and be made to rest in the notch in the same, so as to securely lock the bar. As this swinging bar is being brought into the upright position for securing the animal the inner edge will press against the lower end of the locking-latch, compressing the spring attached thereto, and by this throwing back of the lower end of the latch the free end will be released from its contact with the mortised plate and the stanchion-frame become free to turn in either direction by the movement of the head of the animal, thereby giving perfect freedom of motion to the creature, yet securely holding the same in a locked position.

Having now described my invention, what I claim as new, and desire to secure by Letters Patent, is—

1. The combination of the fixed and swinging stanchion-bars, the lower cross-head, the upper cross-head having the inclined slotted extension, the stanchion-securing bail provided with the hand-lever hinged upon the incline, the bail-operating spring, the stanchion-supporting frame, and the stanchion-securing pivots, arranged substantially as described, and for the purpose set forth.

2. The combination of the fixed stanchion-bar, the swinging stanchion-bar, the upper and lower cross-heads, the stanchion-supporting frame having the lower beveled beam, the stanchion pivot-pins, and the circular plate having the inclines placed underneath the stanchion-frame for automatically bringing the same into the operative position, substantially as described, and for the purpose set forth.

3. The combination of the stanchion-supporting frame, the stanchion-frame having the upper and lower heads, the fixed and swinging bars, the stanchion-locking bail, the inclined head, the stanchion pivot-pins, and the locking-latch engaging the locking-plates upon the under side of the upper cross-head and operated by the spiral spring for holding the open stanchion in position for receiving the head of the animal, substantially as described.

4. The combination of the stanchion-supporting frame, the oscillating stanchion-frame having the swinging bar, the fixed bar, and cross-heads, the pivot-pins, the washer $d'$ upon the upper pin, the flanged plate having the stop-points $b^2$, beveled beam $A^2$, and plate B thereupon, for the purpose described, and substantially as set forth.

HENRY C. MINER.

Witnesses:
F. W. BALLARD,
G. W. FORD.